United States Patent
Huss et al.

(10) Patent No.: US 8,063,349 B2
(45) Date of Patent: Nov. 22, 2011

(54) HELIOSTATS AND SOLAR CONCENTRATION SYSTEMS EMPLOYING HELIOSTATS

(75) Inventors: Shmuel Huss, Jerusalem (IL); Hagai Huss, Jerusalem (IL); Israel Kroizer, Jerusalem (IL); Yoel Gilon, Jerusalem (IL); Danny Franck, Modi'in (IL); Susan Walzer, Givat Ze'ev (IL)

(73) Assignee: Brightsource Industries (Israel) Ltd., Jerusalem (IL)

( * ) Notice: Subject to any disclaimer, the term of this patent is extended or adjusted under 35 U.S.C. 154(b) by 0 days.

(21) Appl. No.: 12/595,241

(22) PCT Filed: Apr. 15, 2008

(86) PCT No.: PCT/US2008/060388
§ 371 (c)(1),
(2), (4) Date: Mar. 29, 2010

(87) PCT Pub. No.: WO2008/128237
PCT Pub. Date: Oct. 23, 2008

(65) Prior Publication Data
US 2010/0175738 A1    Jul. 15, 2010

Related U.S. Application Data

(60) Provisional application No. 60/911,893, filed on Apr. 15, 2007.

(51) Int. Cl.
*G02B 7/04* (2006.01)
*G02B 27/40* (2006.01)
*G02B 27/64* (2006.01)

(52) U.S. Cl. ......... 250/203.4; 353/3; 359/853; 126/680; 126/684

(58) Field of Classification Search ...... 353/3; 126/680, 126/683, 684, 685, 686, 689, 690, 691; 250/203.4, 250/203.7; 359/853
See application file for complete search history.

(56) References Cited

U.S. PATENT DOCUMENTS

| | | | |
|---|---|---|---|
| 811,274 A | 1/1906 | Carter | |
| 3,892,433 A | 7/1975 | Blake | |
| 3,924,604 A | 12/1975 | Anderson | |
| 4,034,735 A | 7/1977 | Waldrip | |
| 4,122,827 A | 10/1978 | Rhodes | |
| 4,162,825 A * | 7/1979 | Dowty | 359/847 |
| 4,209,236 A | 6/1980 | Horton et al. | |

(Continued)

FOREIGN PATENT DOCUMENTS
WO    WO 2008/118980    10/2008
(Continued)

OTHER PUBLICATIONS

Pottler et al., "Photogrammetry: A Powerful Tool for Geometric Analysis of Solar Concentrators and Their Components," Journal of Solar Energy Engineering, Feb. 2005, 127(1):pp. 94-101.

(Continued)

*Primary Examiner* — Francis M Legasse, Jr.
(74) *Attorney, Agent, or Firm* — Miles & Stockbridge P.C.; Mark A. Catan

(57) ABSTRACT

A solar heliostat and system are described with various characteristics particularly suitable for concentrating systems with a relatively large number of small heliostats. Other features contribute to high performance, low cost, high durability, and high temperature operation, such as desired for high efficiency thermal power generation.

20 Claims, 9 Drawing Sheets

U.S. PATENT DOCUMENTS

| | | | |
|---|---|---|---|
| 4,283,887 A | 8/1981 | Horton et al. | |
| 4,435,043 A * | 3/1984 | Mertens et al. | 359/853 |
| 4,440,150 A * | 4/1984 | Kaehler | 126/602 |
| 4,456,332 A * | 6/1984 | Anderson | 156/305 |
| 4,468,848 A | 9/1984 | Anderson et al. | |
| 4,485,803 A | 12/1984 | Wiener | |
| 4,501,469 A | 2/1985 | Merges et al. | |
| 4,536,847 A | 8/1985 | Erickson et al. | |
| 4,564,275 A | 1/1986 | Stone | |
| 5,548,397 A | 8/1996 | Kool et al. | |
| 5,578,140 A * | 11/1996 | Yogev et al. | 136/246 |
| 5,610,818 A | 3/1997 | Ackroyd | |
| 5,929,530 A | 7/1999 | Stone | |
| 5,979,438 A * | 11/1999 | Nakamura | 126/680 |
| 6,080,927 A * | 6/2000 | Johnson | 136/248 |
| 6,689,949 B2 | 2/2004 | Ortabasi | |
| 6,870,087 B1 | 3/2005 | Gallagher | |
| 6,926,440 B2 | 8/2005 | Litwin | |
| 6,959,993 B2 | 11/2005 | Gross et al. | |
| 7,191,597 B2 | 3/2007 | Goldman | |
| 7,191,736 B2 | 3/2007 | Goldman | |
| 7,331,178 B2 | 2/2008 | Goldman | |
| 2004/0144338 A1 | 7/2004 | Goldman | |
| 2005/0279095 A1 | 12/2005 | Goldman | |
| 2007/0012041 A1 | 1/2007 | Goldman | |
| 2007/0084208 A1 | 4/2007 | Goldman | |
| 2007/0157614 A1 | 7/2007 | Goldman | |
| 2007/0221208 A1 | 9/2007 | Goldman | |
| 2008/0000436 A1 | 1/2008 | Goldman | |
| 2008/0011290 A1 | 1/2008 | Goldman et al. | |
| 2008/0293132 A1 | 11/2008 | Goldman et al. | |
| 2009/0107485 A1 | 4/2009 | Reznik et al. | |
| 2009/0155864 A1 | 6/2009 | Bauer et al. | |
| 2009/0197322 A1 | 8/2009 | Goldman | |
| 2009/0217921 A1 | 9/2009 | Gilon et al. | |
| 2009/0229264 A1 | 9/2009 | Gilon et al. | |
| 2009/0250052 A1 | 10/2009 | Gilon et al. | |
| 2010/0006087 A1 | 1/2010 | Gilon et al. | |

FOREIGN PATENT DOCUMENTS

| | | |
|---|---|---|
| WO | WO 2008/128237 | 10/2008 |
| WO | WO 2008/154599 | 12/2008 |
| WO | WO 2009/015219 | 1/2009 |
| WO | WO 2009/015388 | 1/2009 |
| WO | WO 2009/103077 | 8/2009 |

OTHER PUBLICATIONS

Shortis et al., "Photogrammetric Analysis of Solar Concentrators," Proceedings of the 12th Australian Remote Sensing and Photogrammetry Conference, Fremantle, Australia, 2004, pp. 1-10.oncentrators, Proceedings of the 12th Australasian Remote Sensing and Photogrammetry Conference, Fremantle, Australia, 2004.

Shortis et al., "Photogrammetric Analysis of Solar Concentrators," *Proceedings of the 12th Australian Remote Sensing and Photogrammetry Conference*, Fremantle, Australia, 2004, pp. 1-10.

Pottler et al., "Photogrammetry: A Powerful Tool for Geometric Analysis of Solar Concentrators and Their Components," *Journal of Solar Energy Engineering*, Feb. 2005, 127(1): pp. 94-101.

Rabl, Ari, "Tower Reflector for Solar Power Plant," *Solar Energy*, 1976, 18: pp. 269-271.

\* cited by examiner

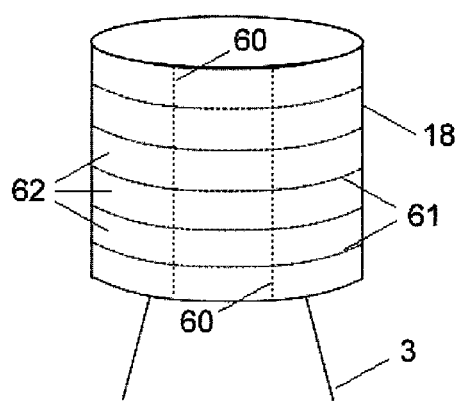
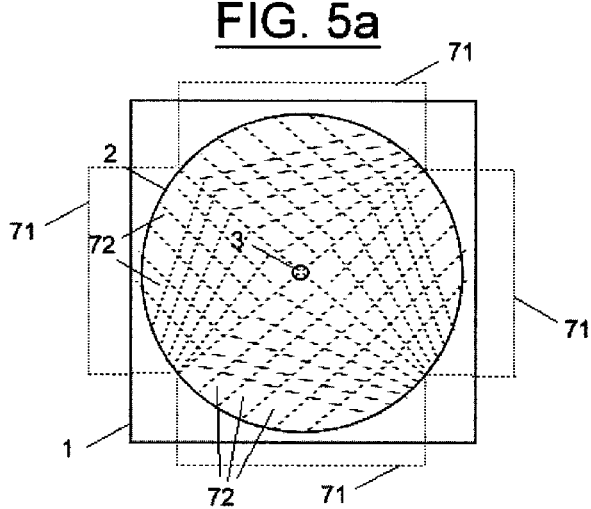
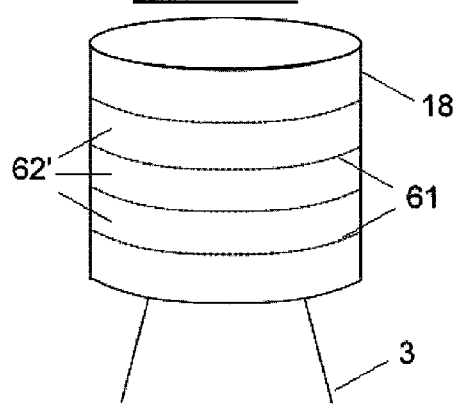
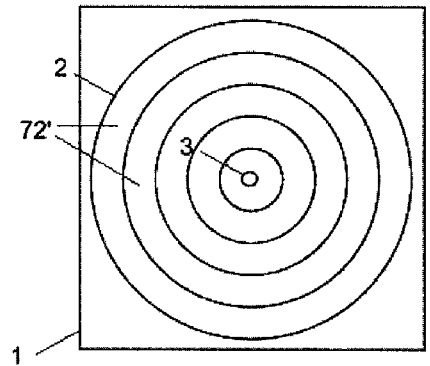

FIG. 8
FIG. 9
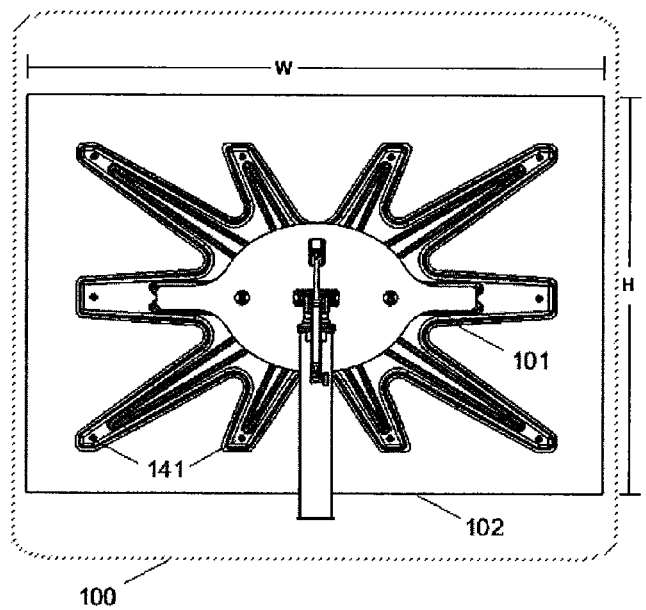
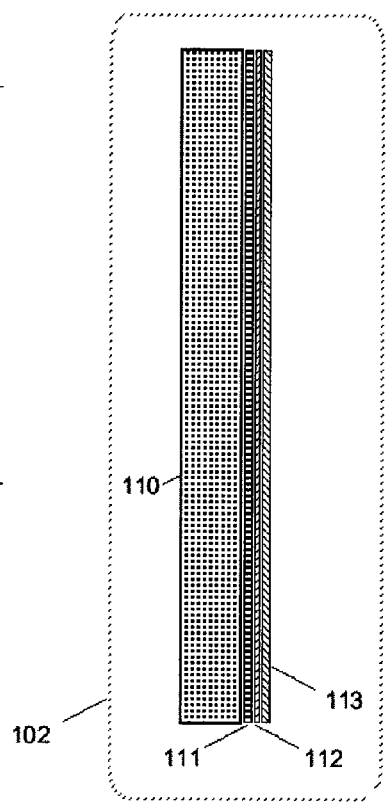
FIG. 10a
FIG. 10b
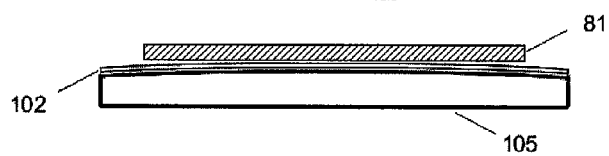

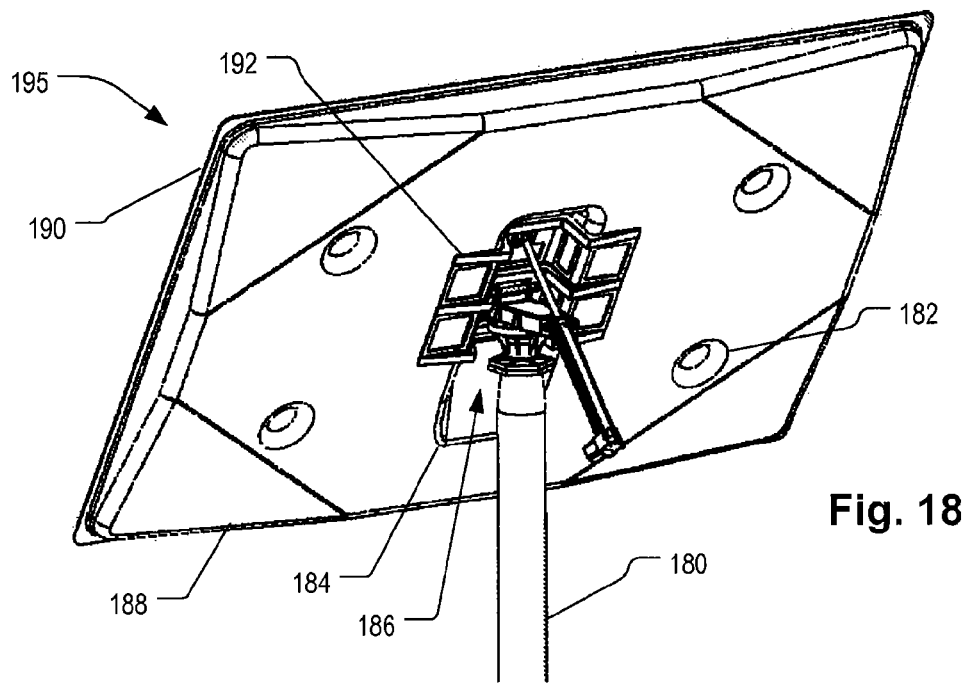
Fig. 18
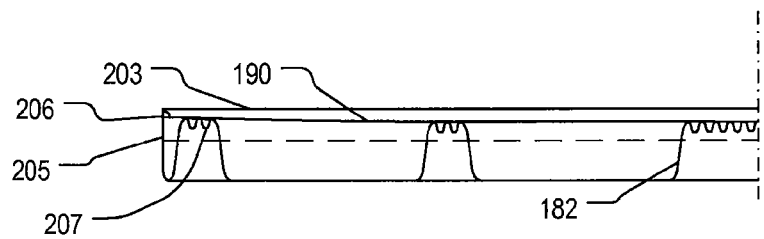
Fig. 19
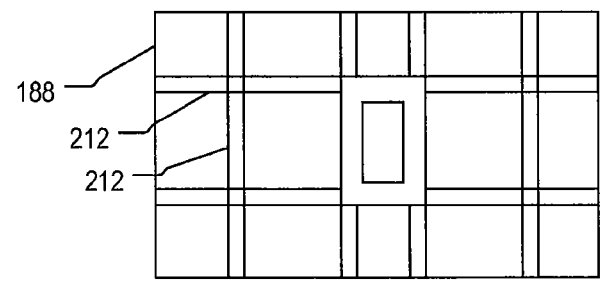
Fig. 20
FIG. 8B

US 8,063,349 B2

HELIOSTATS AND SOLAR CONCENTRATION SYSTEMS EMPLOYING HELIOSTATS

CROSS REFERENCE TO RELATED APPLICATIONS

The present application is a U.S. national stage application of International Application No. PCT/US08/60388, filed Apr. 15, 2008, which claims the benefit of U.S. Provisional Application No. 60/911,893, filed Apr. 15, 2007, now expired, both of which are hereby incorporated by reference herein in their entireties.

FIELD

This disclosure relates to the conversion of solar radiation to electric power.

BACKGROUND

Solar boilers which are heated by concentrating the sun's rays by reflecting them from heliostats are known in the art. Central tower solar energy systems in which a plurality of heliostat mirrors reflect the sun's rays onto a solar receiver mounted atop a tower are described in U.S. Pat. Nos. 3,892,433; 3,924,604; and 4,034,735. Heliostats are described in U.S. Pat. Nos. 4,122,827; 4,209,236; 4,440,150; 4,536,847; 4,564,275; 5,929,530; and 6,959,993.

SUMMARY

An efficient system is described for the conversion of solar radiation to thermal energy, as well as components, articles of manufacture, and other technological improvements. An improved heliostat and heliostat components, as well as an improved heliostat aiming system are described.

The invention, in an embodiment is a heliostat, comprising: a float glass mirror having a thickness of 3-5 mm and an edge therearound, and a hollow back of sheet metal with a skirt defining a dish shape and standoffs positioned to contact the mirror and having heights to determine a shape of the mirror, the hollow back having a skirt portion that covers the edge, the mirror edge being sealed to the skirt, the hollow back being impermeable such as to enclose the mirror back and protect it from exposure to ambient gases, the standoffs being adhesively bonded to the mirror in such a manner that the mirror and back cooperatively form a truss in which they act as compression and tension members to contribute substantially to the rigidity of the combination of back and mirror. Preferably, the heliostat further comprises a material between the standoffs and the mirror to provide allowance for differential expansion of the glass and the back. Preferably, the standoffs include at least one frustoconical portion. Preferably, the mirror is curved to define a focal spot at a distance of at least 20 meters. Preferably, at least one of the standoffs is a channel shaped portion.

In another embodiment, the invention is a heliostat, comprising: a float glass mirror, and a hollow back of sheet metal with a wall portion substantially opposite the mirror, the hollow back having a skirt portion that covers the edge, the mirror edge being sealed to the skirt, the hollow back being impermeable such as to enclose the mirror back and protect it from exposure to ambient gases. Preferably, the glass mirror has a thickness of 3-5 mm and an edge therearound. Preferably, the hollow back has a skirt defining a dish shape. Preferably, the hollow back has standoffs positioned to contact the mirror and have heights to determine a shape of the mirror. Preferably, the standoffs are adhesively bonded to the mirror in such a manner that the mirror and back cooperatively form a truss in which they act as compression and tension members to contribute substantially to the rigidity of the combination of back and mirror. Preferably, there is a material between the standoffs and the mirror to provide allowance for differential expansion of the glass and the back. Preferably, the standoffs include at least one frustoconical portion. Preferably, the mirror is curved to define a focal spot at a distance of at least 20 meters. In a variation, at least one of the standoffs is a channel shaped portion.

In another embodiment, the invention is a solar concentrating system, comprising: a plurality of heliostats, at least one controller configured to control the heliostats such that they are generally aimed at respective aiming points of a receiver and track the apparent movement of the sun, the controller being further configured to randomize the aiming points to achieve a statistically constant distribution of flux over a predefined area of the receiver.

BRIEF DESCRIPTION OF THE DRAWINGS

FIGS. 4a and 4b are diagrammatic illustrations of two aspects of a heliostat aiming system as illustrated in terms of a central solar receiver.

FIG. 5 is a diagrammatic illustration of an aspect of a heliostat aiming system as illustrated in terms of a solar power tower and an associated heliostat field.

FIG. 8 is a rear elevation of a heliostat in accordance with a preferred aspect of the same embodiment.

FIG. 9 is a diagrammatic side view of a mirror.

FIGS. 10a and 10b illustrate diagrammatically the assembly of heliostat and mirror components.

FIGS. 18-20 illustrate embodiments of a heliostat in which a hollow back with integral standoffs together with a mirror defines a truss in which the mirror contributes to the overall stiffness of the complete mirror support structure.

DETAILED DESCRIPTION OF THE EMBODIMENTS

Figure 1A:
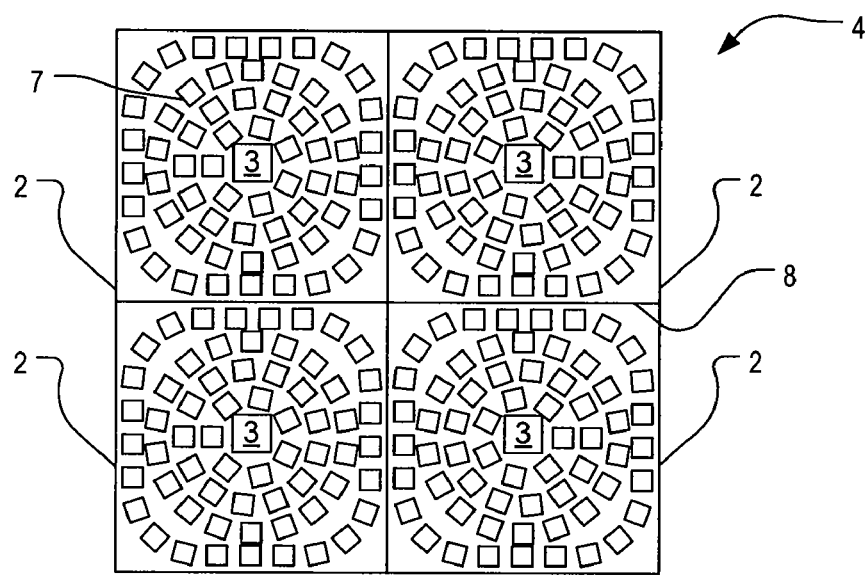
FIGS. 1A and 1B are a diagrammatic views of systems of distributed power towers and associated fields of heliostats.

Referring now to the FIG. 1A, which is a plan view, a system 4 has a plurality of solar fields 2 each having a tower 3 with a receiver (not shown separately) standing therein. The heliostat field 2 is illustrated for simplicity here as a contiguous square area filled with heliostats 7. All of the heliostats 7 in a field are nominally associated with the tower 3 standing at the center of the field 2. The nominal association may be made dependent on the time of year and time of day. The nominal association may be stored in memory connected to a controller (not shown in the present figure by discussed and illustrated elsewhere) which determines the tracking behavior of each heliostat 7.

Although the areas of heliostats 7 that are nominally associated with a tower are shown as contiguous areas 2 in this example, this is for simplicity of illustration and in a real system, there would be expected to overlap such that heliostats 7 assigned to one tower 3 are interleaved with heliostats assigned to a another tower. This has been found to be optimal to make land use more efficient where adjacent heliostats can shade each other and is therefore preferred. However, for purposes of discussion and simplified illustration, heliostats 7 that are commonly assigned are shown as covering a contiguous area 2.

Figure 1B:
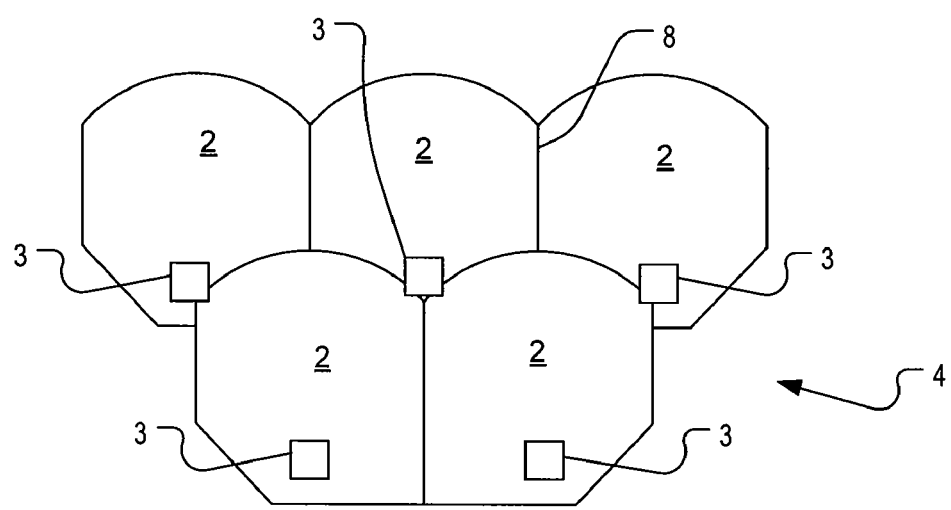
Figure 2:
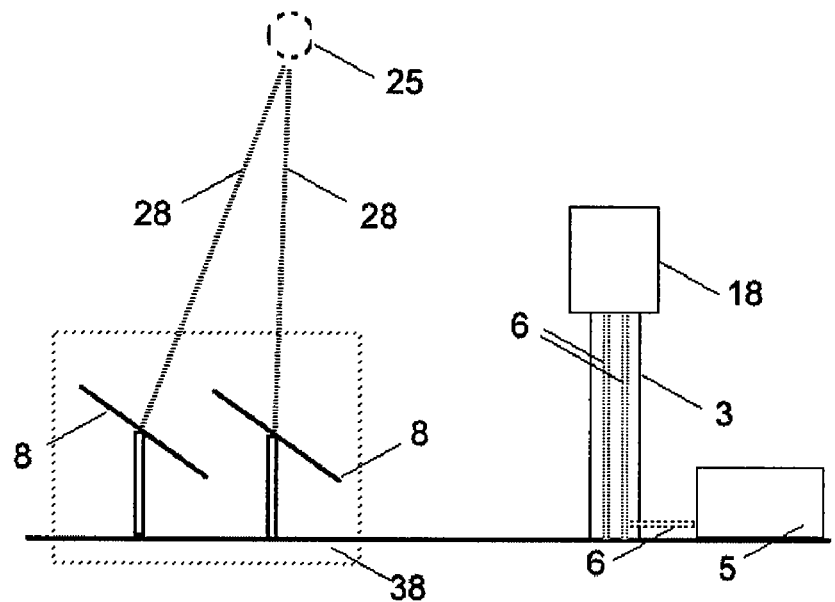
FIG. 2 is a diagrammatic view of a plurality of heliostats and a central power tower.
Figure 3:
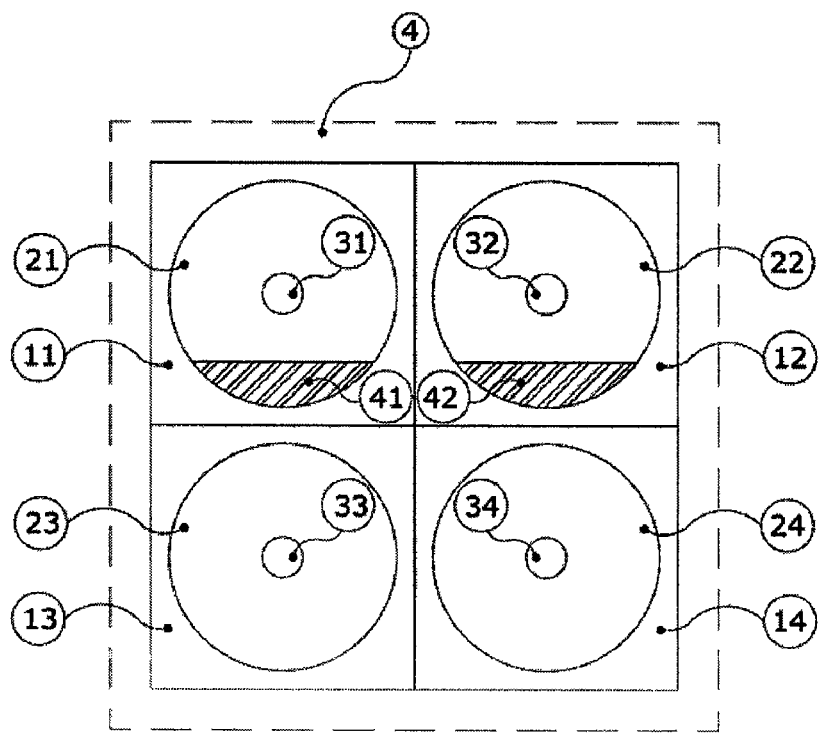
FIGS. 3a and 3b are diagrammatic views of a system of distributed power towers and associated fields of heliostats operated.

Although the fields illustrated in FIG. 1A are four in number, the actual number of fields may vary. Similarly, the heliostat fields in this figure are shown as substantially square, but this is only for purposes of illustration and heliostat fields can be laid out in any suitable geometric shape, including circular, crescent, fishscale-shaped (as illustrated in FIG. 1B where reference numeral are used to identify the same items), oval, or any suitable. The fields may be filled with heliostats 7 up to the boundaries 8 between fields or not. Also, the towers 3 need not be at the center of the associated fields 2 as illustrated in FIG. 1B. Towers 3 may be located anywhere within the confines of their associated field 2 or even outside the associated field 2 but preferably are located at a point that is determined to optimize solar energy capture, electricity production, revenue generation from sales of electricity, or any desired optimization parameter.

Preferably, the heliostats 7 associated with a particular tower 3 include a plurality of heliostat-mounted mirrors (not shown) which reflect solar radiation substantially onto the central receiver (also not shown) situated at or near the top of the tower to minimize shading of heliostats by adjacent heliostats. Note however that in northern latitudes with heliostat fields arrayed on a slope, the receivers may be located close to the ground or even at ground level. Heliostats preferably track in response to the apparent movement of the sun across the sky on each day and similarly compensate for the elevation of the sun as the seasons change. Preferably, this function is provided by a control system which may be distributed with a controller for each, or a subset of, the heliostats, or a central controller.

At least one heliostat-mounted mirror 8 is directed to reflect solar radiation 28 alternately onto the solar receiver 18. A system 4 comprises a plurality of solar fields 11,12,13,14, and is laid out so that in each solar field 11,12,13,14 a central solar power tower 31,32,33,34, respectively, is nominally associated with a field of heliostats 21,22,23,24, respectively, such that each of the towers 31,32,33,34 stands within the boundaries of the heliostat fields 21,22,23,24, respectively, with which it is associated. In this illustrative example, field segments 41,42 comprise a plurality of heliostats which form an ad hoc subset of heliostat fields 21,22, respectively. Under baseline operating conditions all of the heliostat-mounted mirrors in these field segments 41,42 are directed to reflect solar radiation substantially onto the central receivers (not shown) situated at or near the top of towers 31,32, respectively, which have previously been described herein as the towers with which these heliostat-mounted mirrors are nominally associated. In the situation illustrated, it is by way of example noon on a northern hemisphere winter day when the sun is relatively low in the sky, creating a disadvantageously large angle of incidence and reflection for heliostats substantially to the south of the towers with which they are nominally associated. In certain circumstances, including the one illustrated, it will be determined by an operator and/or computerized control system that electricity output of the four-field system would be maximized if heliostat-mounted mirrors fixedly located in field segments 41,42, which are substantially to the south of the towers 31,32 in the northern solar fields 21,22, respectively, with which they are nominally associated, were to be directed instead to reflect incident solar radiation onto the solar receivers (also not shown) situated at or near the top of towers 33,34 respectively, said towers 33,34 being located to the south of the selected field segments 41,42 and therefore being in a position to allow a relatively smaller angle of incidence and reflection which yields higher utilization of incident solar radiation. As a result of having been so directed, substantially all of the heliostat mirrors in the selected field segments 41,42 will turn or pivot in such a way that they reflect incident solar radiation substantially on the central receivers (not shown) situated at or near the top of towers 33,34, respectively.

A method is provided for controlling the aiming points of a plurality of heliostats. The aiming point of a heliostat is the area upon the external surface of a solar receiver that intercepts the light focused by the mirror mounted on the heliostat. Referring now to FIG. 4a, which illustrates the practice of one aspect of this embodiment, aiming points 62 comprise elements of a matrix of aiming points 62 where the matrix is a virtual division of a two-dimensional or isometric projection of the external surface of a receiver 18. As illustrated, the matrix is defined by n virtual vertical gridlines 60 and q virtual horizontal gridlines 61 which divide the two-dimensional or isometric projection into the (n+1)×(q+1) matrix elements which comprise the aiming points 62. Referring as well to FIG. 5a, in one aspect of the embodiment, a solar field 1 includes a heliostat field 2 which comprises a plurality of subsets of a heliostat field 2, each of which is assigned a matrix element as an aiming point. In this illustration, a virtual two-dimensional or isometric projection of the surface of the receiver 18 (not shown) atop the tower 3 is characterized in each of the directions north, east, south, west, although such a projection can be made in any direction, and the heliostat field 2 is virtually divided into quadrants 71 facing each of the virtual projections. Each quadrant 71 is then virtually divided into subsets 72, where the number of subsets 72 is optimally equal to the number of (n+1)×(q+1) matrix elements on a facing two-dimensional or isometric projection of the receiver 18 facing the respective quadrant 71. Referring now to FIG. 4b, which illustrates the practice of another aspect of this embodiment, aiming points 62 comprise elements of an array of aiming points 62' where the array is a virtual division of a two-dimensional or isometric projection of the external surface of a receiver 18'. As illustrated, the array is defined by q virtual horizontal gridlines 61 which divide the two-dimensional or isometric projection into the q+1 array elements which comprise the aiming points 62'. Referring as well to FIG. 5b, in another aspect of the embodiment, a solar field 1 includes a heliostat field 2 which comprises a plurality of subsets of a heliostat field 2, each of which is assigned an array element as an aiming point. In this illustration, heliostat field 2 is virtually divided into subsets 72', where the number of subsets 72' is optimally equal to the number of q+1 array elements on a two-dimensional or isometric projection of the receiver 18'.

In a preferred aspect of the embodiment, aiming points 62 or 62' and the respective heliostats 38 directed thereto are reassigned periodically in order to optimize the distribution of solar heat flux across the external surface of a receiver 18. In a particularly preferred aspect the aiming points 62 or 62' and the respective heliostats 38 directed thereto are updated at intervals less than an hour, for example, once every fifteen minutes. In a further aspect, a heliostat field subset 72 or 72' includes heliostats 38 that are contiguous, non-contiguous, a combination of contiguous and non-contiguous, or chosen without regard to contiguity by a control system.

It has been found that the cumulative inaccuracy of a small number of tracking heliostats 38 in reflecting solar radiation 28 onto their respective aiming points 62 or 62' can cause non-uniform solar heat flux on the surface of a receiver 18 or 18', respectively, including hot spots that can potentially damage the receiver 18 or 18', respectively, or its components. If the cumulative reflection of a heliostat field subset 72 or 72' produces a hot spot on the surface of a receiver 18 or 18', then redirecting that subset 72 or 72' to another aiming point 62 or 62' without changing the makeup of the subset 72 or 72' is likely to perpetuate the problem by creating a hot spot at the new aiming point 62 or 62'. In an especially preferred embodiment, a method of selecting the heliostats 38 directed to a particular aiming point 62 is provided in which the heliostats 38 are directed to particular aiming points 62 on a random basis by using a commercially available computerized randomizing function such as that provided with Microsoft® Visual Basic or the equivalent, instead of on a geographic or geometric basis as in FIG. 5*a*, and thus a plurality of virtual, randomly selected subsets of heliostats 38 is created, where preferably the number of virtual, randomly selected subsets in each quadrant 71 is substantially equal to the number of (n+1)×(q+1) matrix elements on any given two-dimensional or isometric projection of a receiver 18 as shown in FIG. 4*a*. In another aspect, a method is provided in which heliostats 38 directed to particular aiming points 62' are selected on a random basis by using a commercially available computerized randomizing function such as that provided with Microsoft® Visual Basic or the equivalent, instead of on a geographic or geometric basis as in FIG. 5*b*, and thus a plurality of virtual, randomly selected subsets of heliostats 38 is defined, where preferably the number of virtual, randomly selected subsets is substantially equal to the number of q+1 array elements on any given two-dimensional or isometric projection of a receiver 18' as shown in FIG. 4*b*. While FIGS. 5*a* and 5*b* have been drawn so as to show geographic subsets 72 or 72' as being selected from quadrants 71 of one heliostat field 2 or from one heliostat field 2, respectively, and the subsequent discussion of randomly selected heliostats 38 has also been drawn to quadrants 71 of one heliostat field 2 or to one heliostat field 2, respectively, it should be clear from the foregoing description that the subsets 72 or 72' and randomly selected heliostats 38 can be selected from any and/or all of the heliostat fields 2 provided in a solar power tower system 4.

The time base of the random redistribution may be smaller than, or of the order of the temperature change time scale of the system. For example, if a hot spot would take 30 seconds to cause a failure at current (or peak) conditions, the redistribution may be performed at intervals that are less than 30 seconds. These time scales may be computed using thermal and material modeling according to known techniques.

A solar power system includes an aiming system designed with high resolution of reflected solar radiation and effective random assignment of heliostats to subsets which are directed and periodically or occasionally redirected to particular aiming points. This high resolution and effective randomization of heliostat assignment is achieved by employing a far larger number of heliostats than is commonly practiced in the art. The actual points of reflection of incident solar radiation by heliostat mirrors on solar receiver surfaces will have a Gaussian distribution around the intended aiming point. Heliostats currently known in the art in commercial or experimental solar power tower systems commonly include multiple flat mirrors which are assembled on a truss-like structure (box with the opposing layers defining tension and compression elements) which both provides mechanical support and maintains a configuration roughly approximating a three-dimensional predefined shape comprised of flat two-dimensional segments. In multiple-mirror heliostats, the deployment of a larger number of mirrors in a field or field quadrant of heliostat mirrors will yield a cumulative Gaussian distribution curve of the solar reflection aiming errors of the mirrors that is less smooth than would result if the mirrors were to be deployed singly on heliostats, because all of the multiple mirrors on a single heliostat will have almost exactly the same aiming error. Employing a compact heliostat bearing a single mirror provides improved resolution of reflected solar radiation which provides a more uniform solar heat flux on the surface of a central receiver. Employing a compact heliostat bearing a single mirror also provides a larger statistical sample of mirrors and solar reflection aimed therefrom, which firstly causes the Gaussian distribution of the aiming errors of the many mirrors to overlap in such a way that a more uniform flux is obtained, and which secondly by nature of the larger sample size allows a more likely conformity to a predicted Gaussian distribution curve.

Figure 6:
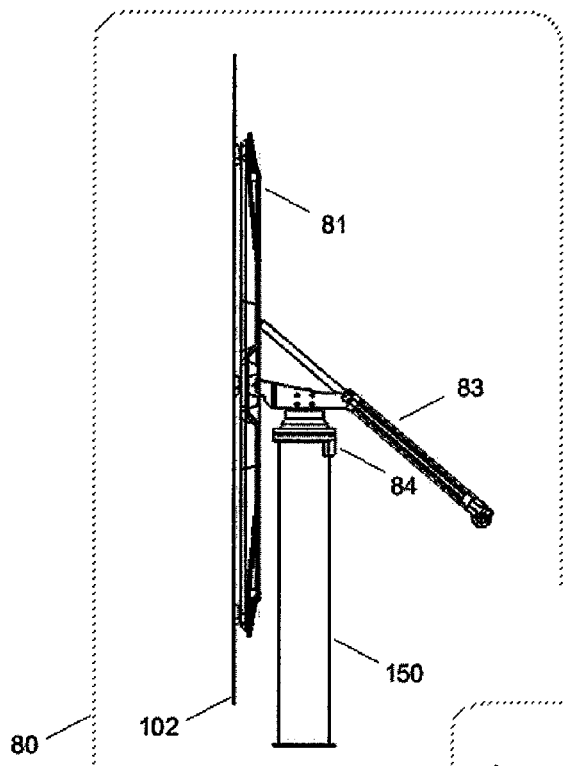
FIG. 6 is a side view of a heliostat.

A compact heliostat 80 as shown in FIG. 6 has a single mirror 102 mounted to a support structure 81. The heliostat includes actuators 83,84 for transmitting energy from stepper motors (not shown) to enable elevation and azimuth movement, respectively. The inventive features and benefits of this heliostat and its components, technologies and articles of manufacture are explained by reference to other figures as explained below in the description of the various aspects of this especially preferred embodiment.

Figure 7:
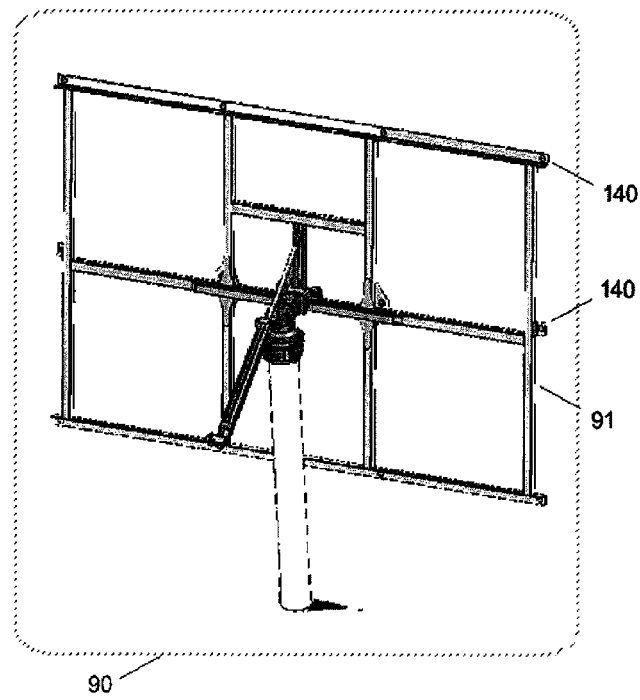
FIG. 7 is an isometric view of heliostat components.

With only a single mirror mounted to the heliostat, it is possible to use a simplified and lower-cost support structure which is largely two-dimensional, such as, for example, a frame, or a stamped or molded plate, as opposed to a largely three-dimensional truss-like structure that is commonly used for larger heliostats. Referring now to FIG. 7, an aspect of the embodiment is illustrated. Compact heliostat 90 is shown in the figure without a mirror, but is otherwise functionally the same as heliostat 80 shown in side view in FIG. 6. As can be seen in the drawing, support structure 91 is an open frame and has been designed to support a single mirror.

Another embodiment is shown in FIG. 8, in which a compact heliostat 100 includes a mirror 102 mounted on a support structure 101 which is a stamped metal plate with channel shaped structures (e.g. spokes 142) formed in it to provide rigidity. The structure 101 can be made economically from stainless steel or from another metal such as an aluminum alloy, either by stamping or alternatively by molding in a powder press, and has the added benefit of allowing compact nesting for shipping in the manner of spoons, for example.

The following comments apply to the embodiments of FIGS. 18-20, discussed below, as well as the instant embodiment. The glass is preferably attached by adhesive with a predefined spacing of flexible material (either by a flexible gap-filling material or the thickness of the layer of adhesive) between the metal and the glass such that the glass may provide a tension element to help provide stiffness while permitting the metal to expand a different rate with temperature relative to the glass. Since the differential expansion of the glass and metal will involve some shape change, preferably the assembly is configured such that the shape of the glass is such as to maximize some system parameter, for example, revenue, based on predicted operating temperatures. In other words, various configurations may be modeled using predicted weather and insolation data and the one with the highest of the desired parameter may be selected. The parameter may be, for example, annual revenue, peak power output on a day whose weather corresponds to the predicted highest collectable flux condition.

Preferably, the edges of the mirror and backing are completely protected by the support structure 102. For example, the structure may be augmented with an edge sealing web in the form of a belt that wraps over the edge of the mirror and attaches to it and the support structure. The support structure is preferably weather proof (e.g., impermeable to water or preferably impermeable to gas). In such an embodiment, the stamped support 102 may form a full enclosure that wraps over the edge of the mirror and is sealed with a bead of sealant.

In another aspect of the embodiment, it has been found to be optimal to employ the largest single mirror that can be commercially produced and that can be commercially shipped to a solar power plant site by standard shipping means. This approach has also been found to be consistent with deploying a sufficiently large number of heliostats in that, for example, a 100 megawatt plant would require approximately 70,000 such heliostats, each bearing the largest single mirror that can be commercially produced and shipped, which, even were they to be divided among four or five distributed power towers, presents a sufficient number of heliostats for the statistical purposes of the aiming system and its randomizing method. In addition, maximizing the size of a single mirror is consistent with minimizing the costs associated with deploying fields of heliostats bearing single mirrors.

Referring again to FIG. 8, a mirror 102 has width W and height H. Study of the worldwide float glass industry shows that the width of the largest production lines capable of producing such mirrors is always between 320 and 325 cm, inclusive. Therefore, in a preferred aspect, width W is in the range 320 to 325 cm, and in an especially preferred aspect is substantially equal to 325 cm. Furthermore, study of commercial shipping methods has revealed that the maximum height of a mirror which can fit either upright or horizontal in a standard shipping container is 225 cm. Of course, a single mirror of greater height could be fit into such a shipping container on a diagonal, but this would not be cost effective for shipping large numbers of such mirrors since each mirror would require its own shipping container. Therefore, in a another preferred aspect, height H is in the range 220 to 225 cm, and in an especially preferred aspect is substantially equal to 225 cm. In another preferred embodiment, the heliostat mirror is a single sheet of glass approximately 1.8 m by 1.6 m and positioned, when oriented vertically, about 0.5 m from the ground.

In a further aspect which is illustrated diagrammatically in FIG. 9 in side view, a mirror 102 includes a first layer 110 of low-iron float glass with a thickness between 3 and 5 mm, and preferably the thickness should be substantially 4 mm. Density of the glass should be between 2.50 and 2.60 grams per cubic centimeter, and preferably the density should be substantially 2.55 grams per cubic centimeter. The mirror 102 additionally includes a second layer 111 of a reflective material such as silver, which is be applied as a coating. In accordance with standard practice in the industry, material loading of second layer 111 should be at least 500 milligrams per square meter and preferably should be at least 700 milligrams per square meter. The mirror 102 optionally includes a third layer 112 of copper to protect the reflective material in second layer 111. If applied, the copper in copper layer 112 should have a material loading of at least 250 milligrams per square meter and preferably at least 300 milligrams per square meter. The mirror 102 also includes a protective backing layer 113 which optionally is applied in multiple applications. Optimally the backing layer 113 will include a polymer-based material; in a preferred aspect the backing layer 113 will include a polyurethane component.

Figure 11:
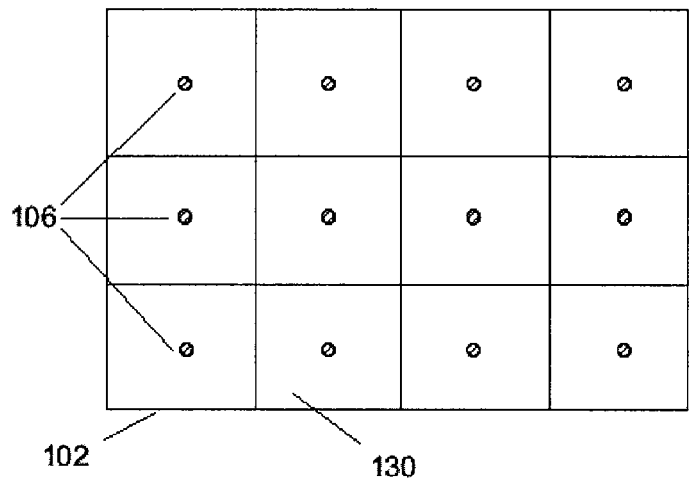
FIG. 11 is a diagrammatic view of a mirror.

In one embodiment, the mirror 102 is flexible enough to allow distortion into a predefined shape selected to form a desired focus size and shape by means of placing it (reflecting side down) onto a molding jig 105 with an upward-facing surface with the predefined shape face (FIG. 10a) and allowing the weight of the mirror 102 to provide the necessary force for the distortion. The mirror 102 may be of stiffness sufficient to substantially maintain an the predefined shape when attached to and supported by a support structure 81 (FIG. 10b) with a minimum of attachment points 106 (FIG. 11). The predefined shape is selected for focusing reflected incident sunlight 28 onto an area on the external surface of a solar receiver 18 smaller than the area of the mirror 102, and forming such a shape in the manner described herein or in a similar manner after the original manufacture of the mirror 102 as a flat mirror is simpler and less expensive than forming a shaped mirror from the beginning. It has been found that a mirror 102 of the dimensions and density disclosed herein will conform to these requirements for stiffness and flexibility if its modulus of elasticity is in the range 71 to 72 gigapascals (GPa) and its torsion modulus is in the range 29 to 29.5 GPa. Preferably the modulus of elasticity should be substantially equal to 71.5 GPa and the torsion modulus should be substantially equal to 29.3 GPa.

Referring further to FIG. 11, the surface of a mirror 102 is virtually divided into a plurality of virtual rectangular subsections 130 of equal dimensions, and at the center of each virtual rectangular subsection 130 is an attachment point 106. In the example shown, the number of attachment points 106 is twelve. The number of attachment points is preferably selected such that the mirror will retain the predefined shape required under peak expected wind conditions. Modification to the spacing of the attachment points is possible; for example, the virtual rectangular subsections 130 need not be of equal area as long as the general considerations of mirror rigidity and flexibility, along with load bearing calculations and wind-related stress, are taken into account.

Figure 12A:
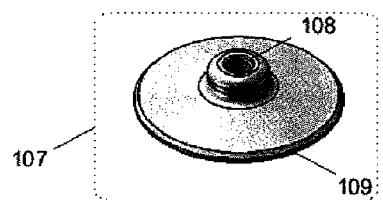
FIGS. 12a and 12b are an isometric and isometric assembly drawing, respectively, of an attachment pad.
Figure 12B:
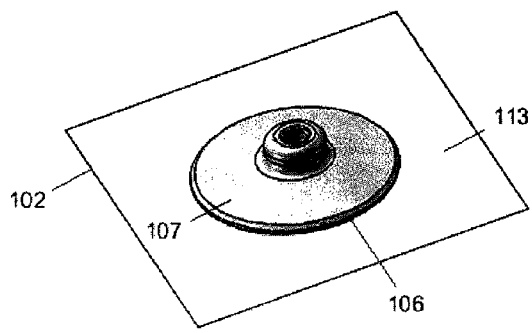

Referring now to FIGS. 12a and 12b, a typical attachment pad 107 is shown. An attachment pad 107, made substantially of a strong metal such as stainless steel or an aluminum alloy, is attached fixedly to the non-reflecting backing layer 113 of mirror 102 at one of the attachment points 106, preferably using an adhesive (not shown), and is used for attaching a mirror 102 to the support structure 81 of a heliostat 38. Optimally, the adhesive chosen is chemically appropriate for a polymer component of the backing layer 113 so that optimal adhesion is achieved. For example, if polyurethane is a component of backing layer 113, then a polyurethane-based adhesive should be used for attaching attachment pads 107. Attachment pads 107 are attached to mirror 102 (noting that in FIG. 12b only a small portion of mirror 102 is shown in order to enable a close-up view) either before or after the process of distorting the mirror 102 into the predefined shape. The flat surface of flange 109 is glued to backing layer 113 of the mirror 102 at an attachment point 106, so that threaded pad receptacle 108 is available for attachment of an assembly of mirror 102 and pads 107 to a support structure 81.

Figure 13A:
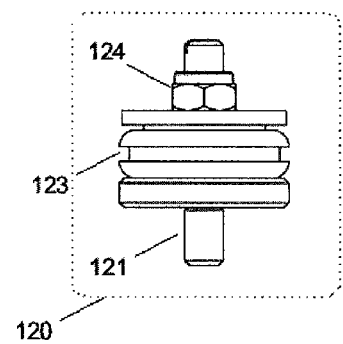
FIGS. 13a and 13b are an elevation view and a cross-section view, respectively.
Figure 13B:
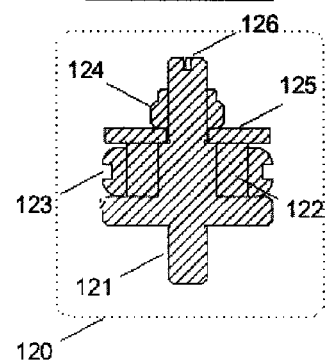
Figure 14A:
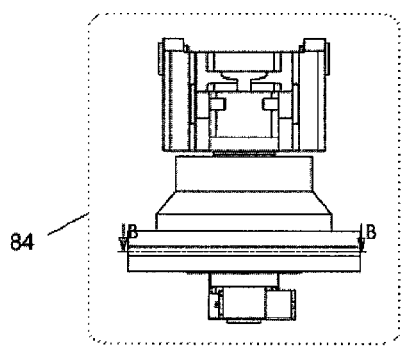
FIGS. 14a and 14b are an elevation view and a cross-section view, respectively, of an azimuth movement actuator.
Figure 15A:
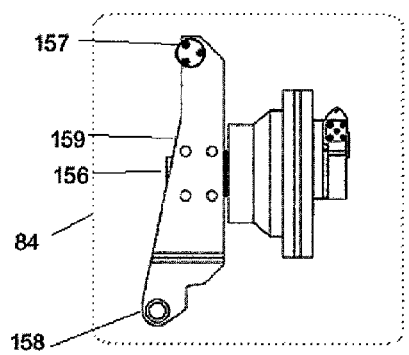
FIGS. 15a and 15b are a side view and an isometric view, respectively, of the same azimuth movement actuator.
Figure 14B:
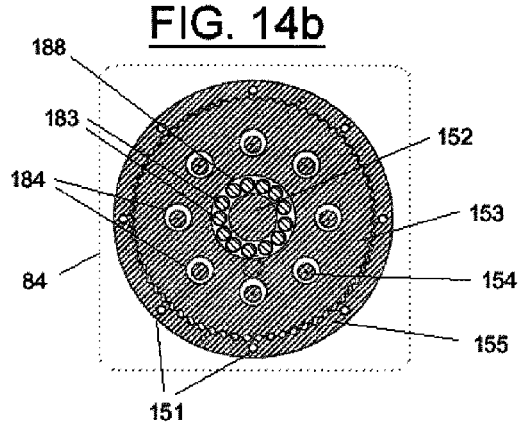
Figure 15B:
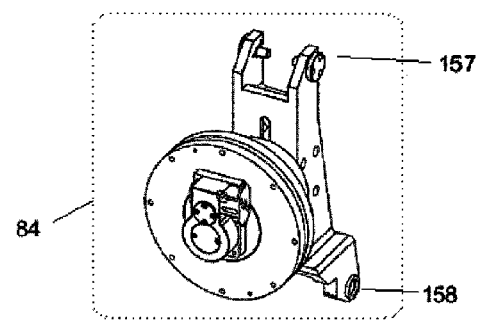

Referring now to FIGS. 13a and 13b, an attachment appliance 120 is shown in elevation and in cross-section, respectively. The attachment appliance 120 is used to attach an assembly of mirror 102 and pads 107 to a support structure 81, by inserting and screwing threaded bolt 121 into threaded pad receptacle 108 of pad 107 to a desired height taking into account the desired shape of mirror 102 and the ultimate position of support structure 81. If provided, a groove 126 in the top of attachment appliance 120 is used in conjunction with a screwdriver or similar tool. Spacer 122 and spacer ring 123 are used to seat the attachment appliance 120 in an attachment hole of appropriate diameter such as, for example, attachment hole 140 in FIG. 7 provided on support structure 91 in FIG. 7 or attachment hole 141 in FIG. 8 provided on support structure 101 in FIG. 8, whereupon upper washer 125 and locking nut 124 are used as shown. Spacer 122 is preferably made of a compressible material such as an industrial foam capable of absorbing forces caused by differences in the thermal expansion coefficients of the glass of mirror 102 and the metal of support structure 81. Spacer ring 123 is preferably made of a slightly compressible material such as a hard rubber, such that the attachment hole 140 or 141 is easily seated on spacer ring 123 but with spacer ring 123 showing little, if any, deformation from stresses resulting from normal operation. If mirror 102 has been distorted into the predefined shape, then this process of attaching a support structure 81 (at all twelve attachment points 106) when the support structure 81 is placed at a normal to the predefined shape surface will result in the mirror 102 being permanently distorted into the predefined shape even after its removal from molding jig 105.

As previously discussed, the capability of a heliostat to direct reflected solar radiation alternately to any tower in a system of distributed solar power towers is preferred. However, heliostats and their drive systems as known in the art have been designed for tracking relative to the apparent movement of the sun across the sky and for reflecting the incident rays of the sun onto a central receiver atop a single solar power tower. This design generally entailed a freedom of azimuth movement through about one-half of a rotation, or up to 180 degrees or a bit more, and this movement could be achieved by deploying a simple linear actuator between an azimuth stepping motor and a heliostat-mounted mirror. This is inadequate for a heliostat that in certain embodiments will be required to reflect solar radiation toward a tower in any direction and therefore, it is preferable to provide an actuating mechanism that enables azimuth movement with a full 360 degrees of rotation.

Therefore there is provided a compact heliostat 80 as shown in FIG. 6, bearing a single mirror 102 attached to a support structure 81 and capable of azimuth movement through a full 360 degrees of rotation by means of azimuth movement actuator 84 mounted on a heliostat pole 150.

Figure 16A:
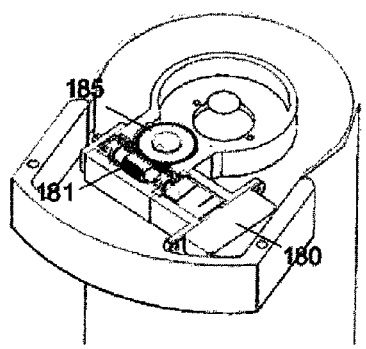
FIGS. 16a and 16b are two sections of a drive system arrangement.
Figure 16B:
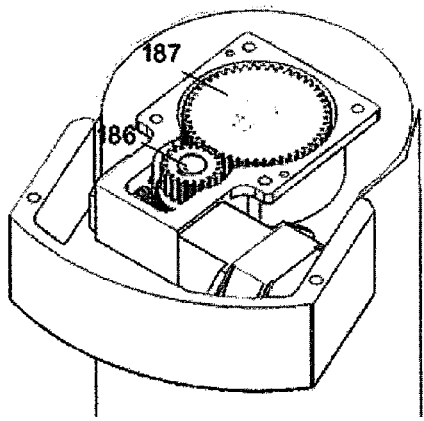

Referring now to FIGS. 14a, 14b, 15a and 15b, a preferred aspect of the embodiment is shown, in which azimuth movement actuator 84 (shown in elevation in FIG. 14a, in cross-section in FIG. 14b, in side view in FIG. 15a and in isometric view in FIG. 15b) includes an epicyclic gearing arrangement to effect azimuth movement. Annulus 155 is attached to heliostat pole 150 (not shown in FIG. 14b), for example by means of attaching bolts or similar devices at annulus attachment points 151 to, also by way of example and illustration, a flange (not shown) on top of heliostat pole 150. Referring as well to FIGS. 16a and 16b, an azimuth drive motor 180 applies a rotational force to worm gear 181 and thereby to gears 186 and 187. Gear 187 is in mechanical communication with central shaft 152, either directly or through additional gearing (not shown) if desired for increasing torque. Preferably the overall gear ratio motor to heliostat will be in the range 1:8000 to 1:9000. Central shaft 152 and bearings 188 are deployed through central hole 188 of planetary gear 153, with bearings 188 deployed around central shaft 152. In mechanical communication with central shaft 152 are cylindrical elements 154 which extend through holes 184 in planetary gear 153 and effect the rotation of planetary gear 153 when central shaft 152 is rotated by force transmitted from motor 180. Bushings (not shown) are optionally provided on cylindrical elements 154 to reduce wear thereupon. The outer diameter of cylindrical elements 154 or of the optional bushings is less than the inner diameter of holes 184, and the outer diameter of planetary gear 153 is smaller than the inner diameter of annulus 155, or alternatively planetary gear 153 is non-circular, all in order to promote an eccentric rotation that eliminates backlash. Sun gear 152 is in further mechanical communication with shaft 156 which is connected to heliostat pivot support 159 by standard mechanical connectors such as bolts, screws and the like. As seen in FIG. 6, one end 157 of heliostat pivot support 159 is connected mechanically to linear actuator 83 and the other end 158 is connected mechanically to support structure 81. Thus, the rotational force of motor 180 is transmitted through the gearing system in such a way as to produce azimuth movement of up to 360 degrees in support frame 81 and mirror 102.

Another advantage shown is that the compact heliostat described herein and bearing a single mirror is that the design enables azimuth and elevation movement of the heliostat to be powered by a local power supply that requires no cabling, trenching or other site work before installation of such a heliostat is completed. In a preferred embodiment, each of a provided azimuth and elevation direct current (DC) stepper motor is powered by a rechargeable battery deployed on or in proximity to the heliostat, and in an especially preferred embodiment, the rechargeable battery is kept charged by a panel of photovoltaic cells mounted on or in proximity to a heliostat-mounted mirror. The photovoltaic panel and battery are sized to ensure continuous availability of power for operation of a heliostat during extended periods of time without sun, during which time the heliostat will be required, for example, to move to various stow and maintenance positions.

Figure 17:
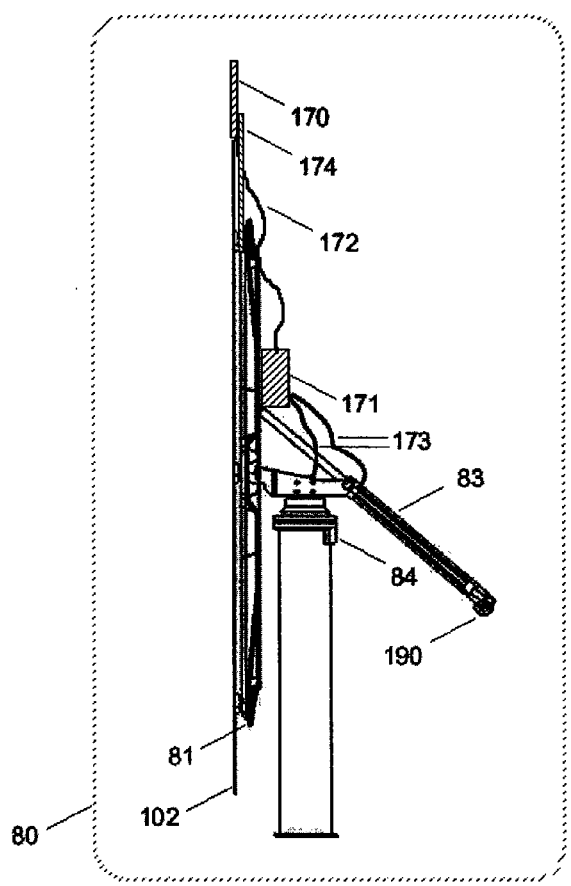
FIG. 17 is a side view of a heliostat.

The practice of this embodiment is illustrated in FIG. 17. A photovoltaic panel 170 is mechanically connected to a heliostat 80 as described herewith. A photovoltaic support member 174 is provided and by means of mechanical attachment such as screws, bolts, adhesives and the like, is attached to an upper section of support structure 81. Photovoltaic support member 174 is located in proximity to the back of mirror 102 and extends at least from the top of support structure 81 to at least the top of mirror 102 at which end of the photovoltaic support member 174 the photovoltaic panel 170 is similarly installed by means of mechanical attachment. Photovoltaic support member 174 can be made of any structural material such as plastic or of a metal such as steel or aluminum and is designed, for example, as an L-profile, circular or rectangular rod, to be of light weight yet sufficiently robust to maintain the position of the photovoltaic panel 170 above mirror 102 and substantially coplanar therewith. Further, a battery pack 171 is mechanically collected to the support structure 81 of heliostat 80 by standard mechanical means. At least one wire 172 connects photovoltaic panel 170 and battery pack 171 and provides electrical communication therebetween. At least one wire 173 connects battery pack 171 between each of azimuth drive motor 180 (not shown in FIG. 17) and elevation drive motor 190 and provides electrical communication therebetween. Each of azimuth drive motor 180 and elevation drive motor 190 has a continuous output rating of 7.5 watts.

Referring now to FIGS. 18-20, another embodiment of a hollow support structure 195 has a dished back portion 188 with standoffs 182 and 184 that space the glass from the dished back portion 188. The standoffs 182, 184 are preferably molded or forged in the back portion 188. The glass mirror 190 is preferably attached by adhesive at many points along which it contacts the back portion. The adhesive attachment, as discussed above, is preferably made with a resilient layer provided to permit differential thermal expansion of the metal and glass while still providing the glass the ability to contribute to the overall stiffness of the resulting structure by forming a truss-like member. An attachment 192 to the drive 186 preferably distributes load over a wide area. In an alternative embodiment, the standoffs are separate elements with varying thickness and shape to shape the mirror with curvatures to suit varying distances from the receiver. In an embodiment in which the standoffs are stamp-forged, inserts can be provided with varying sizes and shapes to cause the standoff heights to vary to form a desired mirror shape which is dependant on the distance from the receiver. In an embodiment, the standoffs have surfaces 207 that permit adhesive material to flow out, thereby permitting the surfaces of the standoffs to determine the position of the back of the mirror 190 precisely. Preferably, the back 188 has channels 212 that give rigidity to it, particularly in a sheet metal embodiment formed by stamping. Such channels 212 may, in embodiments, act as standoffs. A skirt portion 205 may rise to wrap around the mirror. A bead 206 of sealing material may be provided around the entire perimeter to ensure that the back 188 protects the back of the mirror 190 from weather.

Certain features of this invention may sometimes be used to advantage without a corresponding use of the other features. While a specific embodiment of the invention has been shown and described in detail to illustrate the application of the principles of the invention, it will be understood that the invention may be embodied otherwise without departing from such principles.

The invention claimed is:

1. A heliostat, comprising:
 a float glass mirror having a thickness of 3 to 5mm and an edge therearound; and
 a hollow back of sheet metal with a skirt defining a dish shape and standoffs positioned to contact the mirror and having heights to determine a shape of the mirror;
 the hollow back having a skirt portion that covers the edge;
 the mirror edge being sealed to the skirt portion;
 the hollow back being impermeable so as to enclose a back of the glass mirror and to protect it from exposure to ambient gases;
 the standoffs being adhesively bonded to the mirror in such a manner that the mirror and the hollow back cooperatively form a truss in which they act as compression and tension members to contribute substantially to the rigidity of the combination of the hollow back and the mirror.

2. The heliostat of claim 1, further comprising a material between the standoffs and the mirror to provide allowance for differential expansion of the glass and the hollow back.

3. The heliostat of claim 1, wherein the standoffs include at least one frustoconical portion.

4. The heliostat of claim 1, wherein the mirror is curved to define a focal spot at a distance of at least 20 meters.

5. The heliostat of claim 1, wherein at least one of the standoffs is a channel shaped portion.

6. The heliostat of claim 1, further comprising a heliostat pole with an actuator, the heliostat pole supporting the float glass mirror through the hollow back, wherein only a single float glass mirror is supported by the heliostat pole.

7. The heliostat of claim 1, wherein:
 the float glass mirror is a unitary piece having a width between 1.8m and 3.25m and a height between 1.6m and 2.25m, inclusive; and
 the float glass mirror has a non-planar curvature between at least two opposite portions of said mirror edge.

8. The heliostat of claim 1, wherein each standoff is in contact with a back surface of the mirror through an adhesive.

9. The heliostat of claim 1, wherein each standoff is positioned in an area enclosed between the hollow back and the mirror back so as to contact a back surface of the glass mirror.

10. A heliostat, comprising:
 a float glass mirror; and
 a hollow back of sheet metal with a wall portion substantially opposite the mirror;
 the hollow back having a skirt portion that covers an edge of the float glass mirror;
 said mirror edge being sealed to the skirt portion;
 the hollow back being impermeable so as to enclose a back of the glass mirror and to protect it from exposure to ambient gases.

11. The heliostat of claim 10, wherein the glass mirror has a thickness of 3 to 5mm.

12. The heliostat of claim 10, wherein the skirt portion of the hollow back defines a dish shape.

13. The heliostat of claim 10, wherein the hollow back has standoffs positioned to contact the mirror, and the standoffs have heights which determine a shape of the mirror.

14. The heliostat of claim 10, wherein the mirror is curved to define a focal spot at a distance of at least 20 meters.

15. The heliostat of claim 13, wherein the standoffs are adhesively bonded to the mirror in such a manner that the mirror and the hollow back cooperatively form a truss in which they act as compression and tension members to contribute substantially to the rigidity of the combination of the hollow back and the mirror.

16. The heliostat of claim 13, further comprising a material between the standoffs and the mirror to provide allowance for differential expansion of the glass and the hollow back.

17. The heliostat of claim 13, wherein the standoffs include at least one frustoconical portion.

18. The heliostat of claim 13, wherein at least one of the standoffs is a channel shaped portion.

19. The heliostat of claim 15, further comprising a material between the standoffs and the mirror to provide allowance for differential expansion of the glass and the hollow back.

20. A heliostat, comprising:
 a float glass mirror having an edge therearound; and
 a substantially dish-shaped back support structure having a first portion and a skirt extending from a perimeter of the first portion so as to define the dish shape, at least a portion of said skirt wrapping around the edge of the mirror and being sealed thereto such that a hollow inner volume exists between a back surface of the mirror and the back support structure first portion, wherein the hollow inner volume and the back surface of the mirror are protected from ambient gases, the back support structure further including standoffs on the first portion and remote from the first portion perimeter, the standoffs being attached to the back surface of the mirror so as to rigidly couple the mirror to the back support structure, wherein at least some of the standoffs have a different height from others thereof so that a curvature of the mirror is defined by a resulting variation in the standoff heights.

* * * * *